(12) United States Patent
Jolly et al.

(10) Patent No.: US 7,680,312 B2
(45) Date of Patent: Mar. 16, 2010

(54) METHOD FOR KNOWLEDGE BASED IMAGE SEGMENTATION USING SHAPE MODELS

(75) Inventors: Marie-Pierre Jolly, Hillsborough, NJ (US); Nikolaos Paragios, Vincennes (FR); Maxime G. Taron, Paris (FR)

(73) Assignee: Siemens Medical Solutions USA, Inc., Malvern, PA (US)

( * ) Notice: Subject to any disclaimer, the term of this patent is extended or adjusted under 35 U.S.C. 154(b) by 982 days.

(21) Appl. No.: 11/429,685

(22) Filed: May 8, 2006

(65) Prior Publication Data

US 2007/0014457 A1    Jan. 18, 2007

Related U.S. Application Data

(60) Provisional application No. 60/698,826, filed on Jul. 13, 2005.

(51) Int. Cl.
*G06K 9/34* (2006.01)
*G06K 9/46* (2006.01)

(52) U.S. Cl. .................. 382/128; 382/173; 382/203

(58) Field of Classification Search .......... 382/128, 382/131, 132, 173, 203
See application file for complete search history.

(56) References Cited

U.S. PATENT DOCUMENTS

2006/0056698 A1*  3/2006  Jolly et al. ............. 382/190

OTHER PUBLICATIONS

Wang et al. "Regularized Shape Deformation for Image Segmentation." Proceedings 2001 International Conference on Acoustics, Speech, and Signal Processing, vol. 3, May 7, 2001, pp. 1569-1572.*

He et al. "Segmentation of Tibia Bone in Ultrasound Images Using Active Shape Models." Proceedings of the 23rd Annual International Conference Of the IEEE Engineering in Medicine and Biology Society, 2001, vol. 3, Oct. 25, 2001, pp. 2712-2715.*

Hans Lamecker, Martin Seebass, Hans-Christian Hege, Peter Deuflhard "A 3D statistical shape model of the pelvic bone for segmentation" Proc. SPIE 5370, Medical Imaging 2004: Image Processing, Conference Location: San Diego, CA, USA, Feb. 16, 2004.

(Continued)

*Primary Examiner*—Jon Chang
(74) *Attorney, Agent, or Firm*—Donald B. Paschburg

(57) ABSTRACT

A method for segmenting an object of interest from an image of a patient having such object. Each one of a plurality of training shapes is distorted to overlay a reference shape with a parameter $\Theta_i$ being a measure of the amount of distortion required to effect the overlay. A vector of the parameters $\Theta_i$ is obtained for every one of the training shapes through the minimization of a cost function along with an estimate of uncertainty for every one of the obtained vectors of parameters $\Theta_i$, such uncertainty being quantified as a covariance matrix $\Sigma_i$. A statistical model represented as $\hat{f}_H(\Theta,\Sigma)$ is generated with the sum of kernels having a mean $\Theta_i$ and covariance $\Sigma_i$. The desired object of interest in the image of the patient is identified by positioning of the reference shape on the image and distorting the reference shape to overlay the obtained image with a parameter $\Theta$ being a measure of the amount of distortion required to effect the overlay. An uncertainty is quantified as a covariance matrix $\Sigma$ and an energy function $E=E_{shape}+E_{image}$ is computed to obtain the probability of the current shape in the statistical shape model $E_{shape}(\Theta,\Sigma)=-\log(\hat{f}_H)$ and the fit in the image $E_{image}$.

9 Claims, 10 Drawing Sheets

OTHER PUBLICATIONS

Geremy Heitz, Torsten Rohlfin, Calvin R. Maurer, Jr. "Statistical Shape Model Generation Using Nonrigid Deformation of a Template Mesh" SPIE vol. 5747, Medical Imaging 2005; Image Processing, Conference Location: San Diego, CA, USA, Feb. 17, 2005.

Lifeng Liu, Stan Sclaroff "Medical Image Segmentation and Retrieval Via Deformable Models" Image Processing, 2001, Proceedings, 2001, International Conference on, vol. 3, Oct. 7-10, 2001, pp. 1071-1074.

Koikkalainen, J.; Lotjonen, J. "Image segmentation with the combination of the PCA-and ICA-based models of shape variation" Biomedical Imaging: Nano to Macro, 2004, IEEE International Symposium on, Apr. 15-18, 2004. pp. 149-152 vol. 1.

* cited by examiner

METHOD FOR KNOWLEDGE BASED IMAGE SEGMENTATION USING SHAPE MODELS

CROSS REFERENCE TO RELATED APPLICATION

This application claims priority from U.S. Provisional application No. 60/698,826, filed Jul. 13, 2005, which is incorporated herein by reference.

TECHNICAL FIELD

This invention relates generally to methods for anatomical object segmentation and more particularly the use of prior knowledge of the anatomical object for anatomical object segmentation.

BACKGROUND

As is known in the art, many techniques used in the quantitative analysis of objects, such as anatomies and pathologies, from large three-dimensional (3D) volume of imaging data, such as CT data, includes the segmentation of the objects from neighboring-objects. Over the last decade, shape-based segmentation methods have become more and more common. First introduced in 1995, active shape models (ASM) and active appearance models (AAM), as described by T. F. Cootes and C. J. Taylor in "Statistical models of appearance for computer vision", *Technical Report, University of Manchester*, 2004 have been very popular tools for the segmentation of anatomical structures in medical images. See also: J. G. Bosch, S. C. Mitchell, B. P. F. Lelieveldt, F. Nikland, O. Kamp, M. Sonka, and J. H. Reiber "Automatic segmentation of echocardiographic sequences by active appearance motion models", *IEEE Trans. Medical Imaging*, 21(1 1):1374-1383, 2002; Duta and M. Sonka "Segmentation and interpretation of MR brain images: An improved active shape model", *IEEE Trans. Medical Imaging*, 17(6):1049-1062, 1998; and A. Lundervold, N. Duta, T. Taxt, and A. Jain. "Model-guided segmentation of corpus callosum in MR images" CVPR, pages 123 1-1238, 1999.

More recently, principal component analysis (PCA) has also been applied to distance transforms for an implicit representation of shapes, see M. Leventon, E. Grimson, and O. Faugeras, "Statistical Shape Influence in Geodesic Active Contours" *IEEE Conference on Computer Vision and Pattern Recognition*, pages I:3 16-322, 2000. Shape-based segmentation is usually equivalent to recovering a geometric structure which is both highly probable in the model space and well aligned with strong features in the image. The advantage of the shape based methods over classical deformable templates is that they allow the deformation process to be constrained to remain within the space of allowable shapes, see T. McInerney, G. Hamarneh, M. Shenton, and D. Terzopoulos. Deformable organisms for automatic medical image analysis. *Medical Image Analysis*, 6:251-266, 2002. These methods have proven to be a good compromise between complexity and shape generalization. However, since modeling is performed after registration, errors in the registration can be propagated into the model space. Furthermore, the assumption of Gaussian shape models might be a little restrictive.

SUMMARY

In accordance with the present invention, a method is provided for segmenting an object of interest from an image of a patient having such object. The method includes transforming a generated reference shape of the object to match every one of a plurality of training shapes according to an energy function comprising distorting each one of the training shapes to overlay the reference shape with a parameter $\Theta_i$ being a measure of the amount of distortion required at each grid point to effect the overlay for the $i^{th}$ one of the N training shapes. The method obtains a vector of the parameters $\Theta_i$ for every one of the training shapes through the minimization of a cost function. The method estimates an uncertainty for every one of the obtained vectors of parameters $\Theta_i$, such uncertainty being quantified as a covariance matrix $\Sigma_i$. The method provides for the plurality of training shapes a statistical model represented as $\hat{f}_H(\Theta,\Sigma)$ which is the sum of the K Gaussian kernels having a mean $\Theta_i$ and covariance $\Sigma_i$.

In one embodiment, the cost function is the sum squared difference between the distance map generated for one of the training shapes and the transformed reference model.

In one embodiment, the method includes additionally: obtaining the image of the desired object from the patient; identifying the desired object of interest in the image of the patient by positioning of the reference shape on the image comprising: transforming the generated reference shape to match the obtained image according to the energy function comprising distorting the reference shape to overlay the obtained image with a parameter $\Theta$ being a measure of the amount of distortion required to effect the overlay; estimating an uncertainty, such uncertainty being quantified as a covariance matrix $\Sigma$; computing the shape term of an energy function $E_{shape}(\Theta,\Sigma)=-\log(\hat{f}_H)$ to obtain the probability of the current shape in the statistical shape model; and computing the image term of an energy function $E_{image}$ to evaluate the fit of the shape in the image minimizing the energy function $E_{shape}+E_{image}$ More particularly, $E_{shape}(\Theta,\Sigma)=-\log(\hat{f}_H)$ and $E_{image}$ are computed, $\Theta$ is changed, a new covariance matrix is computed as $\Sigma^{-1}{}_\Theta$, to thereby compute a new $E_{shape}(\Theta,\Sigma)=-\log(\hat{f}_H)$ and $E_{image}$ until the overall energy function is minimized.

In one embodiment the minimization of $E_{shape}(\Theta,\Sigma)=-\log(\hat{f}_H)$ comprises: computing $E_{shape}(\Theta,\Sigma)=-\log(\hat{f}_H)$ and $E_{image}$; changing $\Theta$; generating a new covariance matrix as $\Sigma$, to thereby compute a new $E_{shape}(\Theta,\Sigma)=-\log(\hat{f}_H)$ and $E_{image}$ until $E_{shape}(\Theta,\Sigma)+E_{image}$ is minimized.

In one embodiment a method is provided for learning deformations of an object of interest from an image bank of a patient having such object, comprising: generating an initial reference shape of the object of interest to be segmented; obtaining a predetermined number of, N, images of the desired object from over a general population of such objects, where N is greater than 1; transforming the generated reference shape to match every one of the N training shapes according to an energy function comprising distorting each one of the N training shapes to overlay the reference shape with a parameter $\Theta_i$ being a measure of the amount of distortion required at each grid point to effect the overlay for the $i^{th}$ one of the N training shapes; obtaining a vector of the parameters $\Theta_i$ for every one of the N training shapes through the minimization of a cost function; estimating an uncertainty for every one of the obtained N vectors of parameters $\Theta_i$, such uncertainty being quantified as a covariance matrix $\Sigma_i$; providing a statistical model represented as $\hat{f}_H(\Theta,\Sigma)$ cumulating all informations of the N training shapes modeled with kernels having a mean $\Theta_i$ and covariance $\Sigma_i$.

In one embodiment the uncertainty is computed by assuming that the energy function can be approximated at its minimum by a paraboloid, the width of the paraboloid being representative of the degree of uncertainty.

In one embodiment, the reference shape is on a reference coordinate system having a free form deformation grid, such free form deformation grid having a plurality of grid points and wherein a projection of the covariance matrix onto a grid point provides an ellipse having a component tangent to the reference shape and having another component normal to the reference shape.

In one embodiment the method includes additionally: obtaining the image of the desired object from the patient; identifying the desired object of interest in the image of the patient by positioning of the reference shape on the image comprising: transforming the generated reference shape to match the obtained image according to the energy function comprising distorting the reference shape to overlay the obtained image with a parameter $\Theta$ being a measure of the amount of distortion required to effect the overlay; estimating an uncertainty, such uncertainty being quantified as a covariance matrix $\Sigma$; computing an energy function $E_{shape}$ to obtain the probability of the current shape in the statistical shape model; and minimizing $E_{shape}(\Theta,\Sigma)=-\log(\hat{f}_H)$, comprising: computing $E_{shape}(\Theta,\Sigma)$ and $dE_{shape}(\Theta,\Sigma)/d\Theta=-d\log(\hat{f}_H)/d\Theta$; changing $\Theta$; generating an updated covariant matrix with the changed $\Theta$; recomputing the energy function $E_{shape}$.

A variational technique for the knowledge based segmentation of two-dimensional objects is used wherein higher order implicit polynomials are used to represent shapes. The method estimates uncertainties on the registered shapes, which can be used with a variable bandwidth kernel-based non-parametric density estimation process to model prior knowledge about the object of interest. Such a non-linear model with uncertainty measures is integrated with an adaptive visual-driven data term that aims to separate the object of interest from the background. Promising results obtained for the segmentation of the corpus callosum in MR mid-sagittal brain slices demonstrate the potential of such a framework.

More particularly, shapes are represented implicitly using the distance transform. To generate a model of the structure of interest, the method registers shape examples using a spline based free form deformation. The method includes the derivation of a measure representing the uncertainty of the registration at the zero iso-surface. After dimensionality reduction, these measures are combined with a variable bandwidth kernel-based approach to derive a density function that models the family of shapes under consideration. Given a new image, the segmentation process is expressed in a variational level set framework, based on the Hamilton-Jacobi formulation where the energy function makes use of the uncertainties of the registration between the deformed shape which aligns to the image features and the model.

Shapes are represented implicitly using the distance transform. To generate a model of the structure of interest, we register shape examples using a spline based free form deformation. The main contribution of this paper is the derivation of a measure representing the uncertainty of the registration at the zero iso-surface. After dimensionality reduction, these measures are combined with a variable bandwidth kernel-based approach to derive a density function that models the family of shapes under consideration. Given a new image, the segmentation process is expressed in a variational level set framework, (see S. Osher and J. Sethian. Fronts propagating with curvature-dependent speed: Algorithms based on the Hamilton-Jacobi formulation", *Journal of Computational Physics*, 79:12-49, 1988) where the energy function makes use of the uncertainties of the registration between the deformed shape which aligns to the image features and the model.

The details of one or more embodiments of the invention are set forth in the accompanying drawings and the description below. Other features, objects, and advantages of the invention will be apparent from the description and drawings, and from the claims.

DESCRIPTION OF DRAWINGS

FIG. 5A showing automatic rough positioning of the model, FIG. 5B showing segmentation through affine transformation of the model; FIG. 5C showing segmentation using the local deformation of the FFD grid and uncertainties estimates on the registration/segmentation process.

Like reference symbols in the various drawings indicate like elements.

DETAILED DESCRIPTION

Figure 1A:
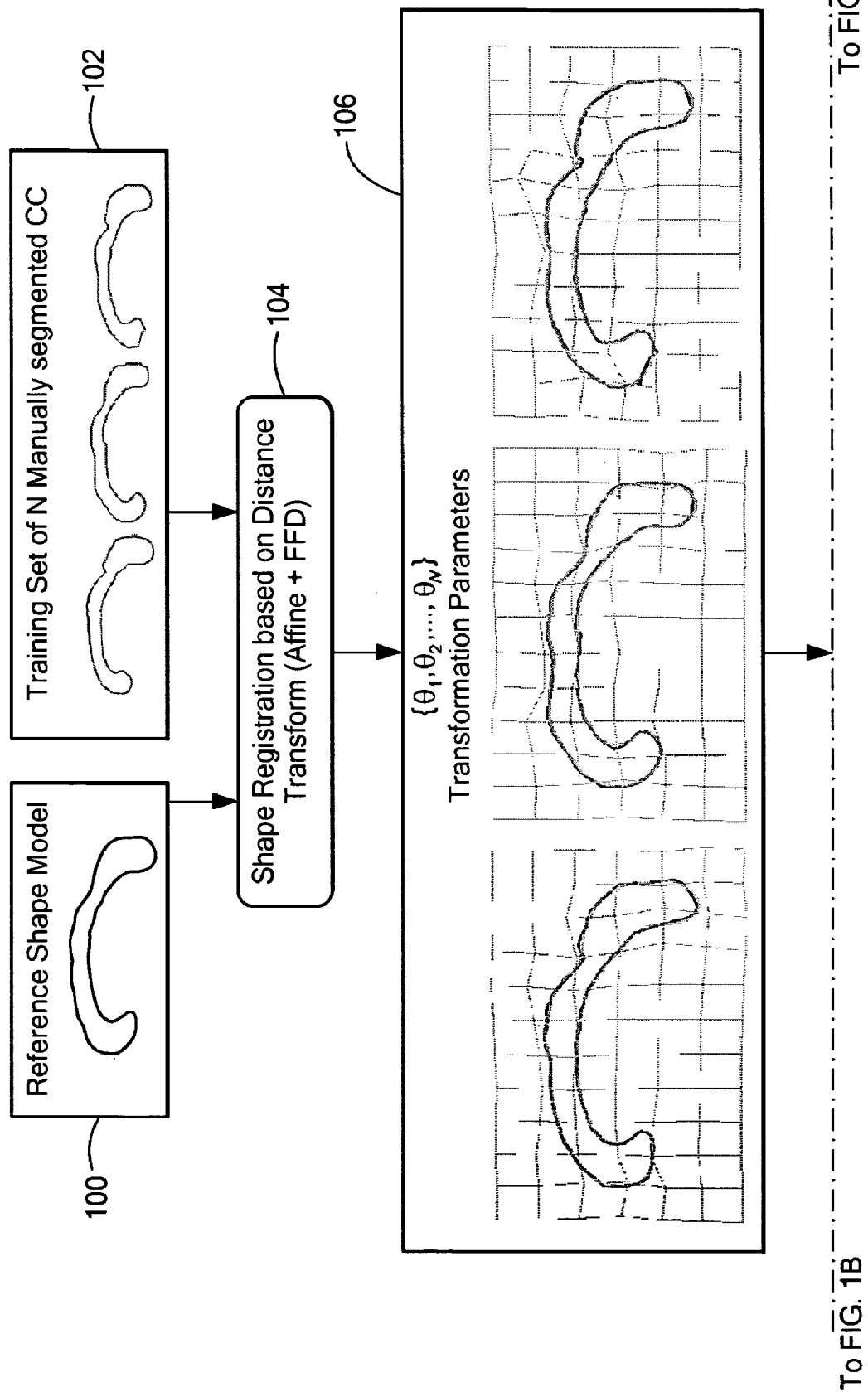
FIG. 1 shows the relationship of FIG. 1A and FIG. 1B which together is a flow diagram of a process for generation of prior knowledge of an object to thereby generate a statistical shape model of the object according to the invention.
Figure 1B:
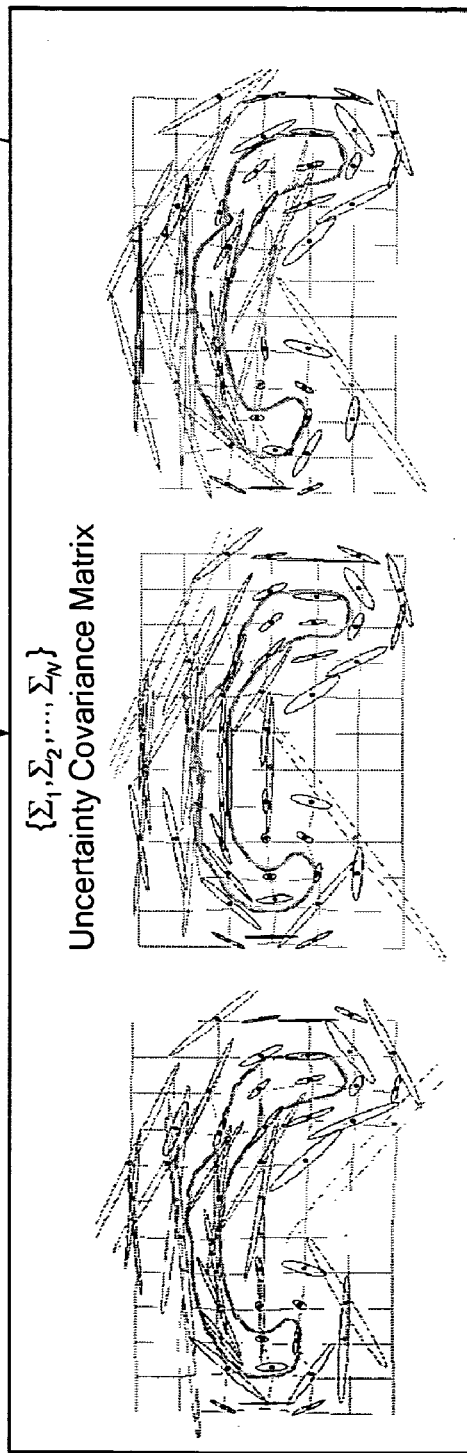
Figure 2A:
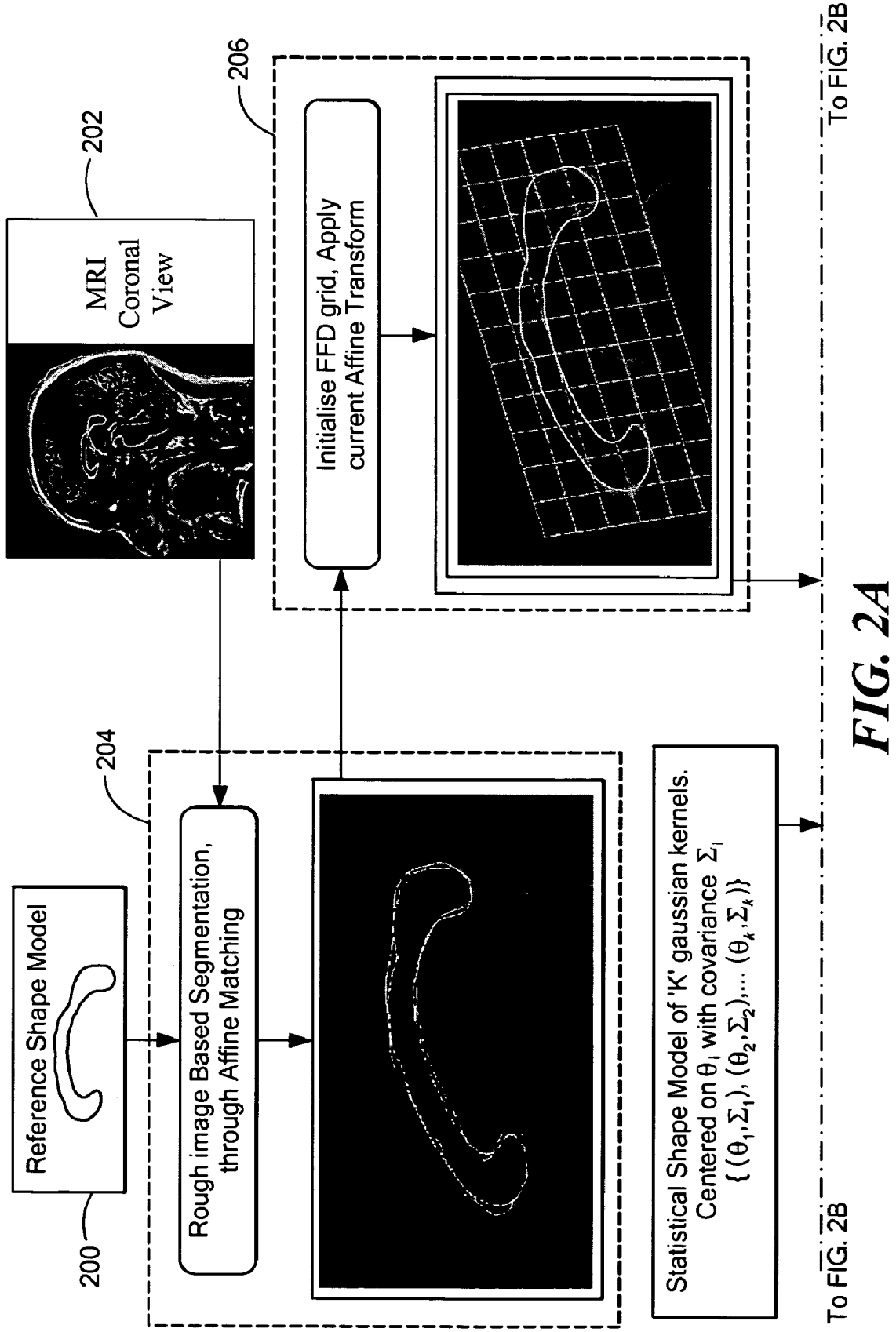
FIG. 2 shows the relationship of FIG. 1A and FIG. 1B which together is a flow diagram of a process used to segment the object from an image of a patient using the statistical shape model generated by the process of FIG. 1 in accordance with the invention.
Figure 2B:
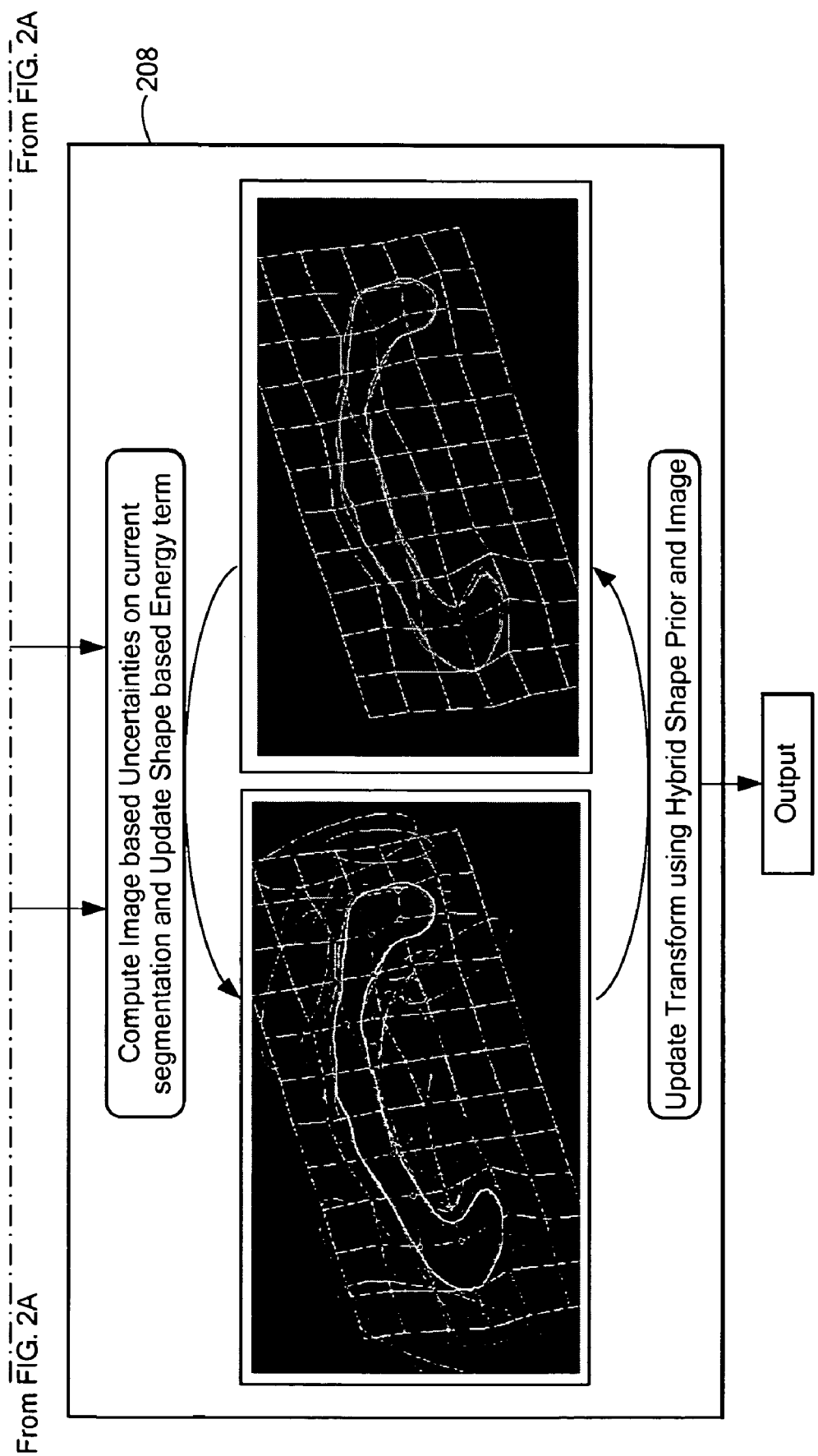

Referring now to FIGS. 1 and 2, a process is shown for segmenting an object of interest from an image of a patient having such object. The process first includes generation of prior knowledge of the object, here by generating a statistical shape model of the object Steps 100 through 114 in FIG. 1. Next, the process uses the generated statistical shape model to segment the object from an image of the patient, here a Magnetic Resonance Image (MRI), Steps 200-208 in FIG. 2.

Generation of Statistical Shape Model

Referring to FIG. 1, the process generates an initial reference shape model of an object of interest to be segmented, Step 100. The reference shape model is on a reference coordinate system, such as an x-y Cartesian coordinate system, having a free form deformation grid, such free form deformation grid having a plurality of, here M, grid points.

Next, the process obtains a predetermined number of, N, images of the desired object from over a general population of such objects, where N is greater than 1 to provide N training shapes, Step 102. Each one of the training shapes is, initially, reference to the reference coordinate system in Step 100 having the plurality of, here M, grid points;

Next, the process transforms the reference shape generated in Step 100 to match every one of the N training shapes obtained in Step 102 according to an energy function, Step 104. Here the energy function is a function the amount of difference between the transformed reference shape and the training shape. More particularly, the transformation comprises distorting each one of the N training shapes so that it overlays the reference model with a parameter $\Theta_i$ being a measure of the amount of distortion (translation vector) required at each grid point to effect the overlay for the i$^{th}$ one of the N training shapes. The transformation of the reference model (for example an affine or Free Form Deformation (FFD) transformation) is a smooth function of a finite set of the parameters $\Theta_i$. A vector of the parameters '$\Theta_i$' is obtained for every one of the N training shapes through the minimization of an adequate cost function, such as, for example, the distance between such one of the N training shapes and the transformed reference model. Thus, for every one of the N training shapes there is a vector of the parameters $\Theta_i$, where each one of the vectors has M elements, (i.e., one for each one of the M grid points) and each element having a pair of components, (one in x direction and one in y direction).

Next, the process generates a vector of the parameters '$\Theta_i$' for every one of the N training shapes obtained in Step 102 and obtains a set of 'N' vectors of the parameters '$\Theta_i$', each one of the N vectors having M elements, each one of the M elements having two components, Step 106.

Next, the process estimates a degree of uncertainty for every one of the N vectors of parameters '$\Theta_i$' obtained from Step 106, Step 108. The degree of uncertainty is computed with the Hessian of the cost function associated to i$^{th}$ one of the N training shapes, i.e., shape 'i'. Uncertainty is quantified as a covariance matrix '$\Sigma_i$'. Then, the transformation parameters of the registration of shape 'i' is assumed to follow a Gaussian distribution having a mean '$\Theta_i$ and standard deviation $\Sigma_i$. The uncertainty is computed by assuming that the energy function can be approximated at its minimum by a quadratic form, here a parabola (e.g., a quadratic function $x^T \Sigma x$). The width of the paraboloid (in 2M dimensions) is equivalent to the uncertainty. If the paraboloid is very narrow, the energy is sharp at its minimum and there is little uncertainty about the value of the parameter at which the energy is minimum. When the covariance matrix is projected onto a grid point, the uncertainty at a grid point can be represented by an ellipse elongated in the direction of greater uncertainty. In the case of smooth linear contours, a component is tangent to the shape and another component is normal to the shape.

Next, the process generates the covariance matrix '$\Sigma_i$' for every one of the N training shapes obtained in Step 102 using the estimated uncertainties obtained in Step 108, Step 110. The statistical model representing the deformation is assumed to have a probability density function estimated with the sum of all 'N' kernels. A kernel is an elementary probability distribution used for non parametric density estimation: this statistical model is said to be non parametric as the number of kernels ('N') is in theory unlimited, and the more kernels we have, the better the statistical model.

Next, the process removes a predetermined number, R, of the N training shapes used in the training set of Step 102 to thereby leave K training shapes (where K is much, much less than N), Step 112. The R removed images are less helpful in the statistical shape model being generated. The K selected shapes are those maximizing the likelihood of the complete training set. The choice for K depends on the application; it is a compromise between the computational cost (linear in K) and the increase in likelihood obtained if adding another sample to the set of the K selected shapes (i.e., kernels).

Next, the process generates the final statistical model using the sum of 'K' Gaussian kernels from Step 112 centered at '$\Theta_i$' with covariance $\Sigma_i$, Step 114. In practice '$\Theta_i$' only contains the coordinates of the FFD grid, the global affine transform is not part of the learning. The statistical model provides a set of statistical parameters, e.g., mean and deviation from the mean, characteristic of the class of objects of interest. The statistical model can then be expressed as $f_H(\Theta,\Sigma)$ (equation 3) which is the sum of the K Gaussian kernels with mean $\Theta_i$ and covariance $\Sigma_i$. This function is the probability of a shape given by its transformation parameters.

Segmentation of the Object from an Image of the Patient

Referring again to FIG. 2, the process uses the same reference model as in Step 100, Step 200. The process obtains an image (I) of the desired object from a patient, such image being in an image domain, Step 202.

The process then uses matching techniques, in the image domain, to identify the desired object of interest in the image of the patient, Step 204. More particularly, the process positions the reference model on the image obtained in Step 202 with respect to an affine transformation (using translation, rotation, scaling and shearing) estimated using basic region based segmentation techniques. That is a global, i.e., affine, transformation.

A local matching technique is used in Step 206, on top of the formerly retrieved global transformation. More particularly, this is the same FFD) grid as used in Step 104 with 'M' grid points. The FFD transformation is applied directly on the reference model from step 200 and the affine transformation retrieved in step 204 is applied subsequently to transport the reference from the model domain to the image domain.

Next, the process computes an energy function $E_{shape}$ from the statistical shape model obtained in Step 114 to obtain the probability of the current shape in the statistical shape model and minimizes $E_{shape}(\Theta,\Sigma) = -\log(f_H)$ by:

computing $E_{shape}(\Theta,\Sigma) = -\log(f_H)$ and $dE_{shape}(\Theta,\Sigma)/d\Theta = -d\log(f_H)/d\Theta$; changing $\Theta$; generating an updated covariance matrix with the changed $\Theta$; recomputing the energy function $E_{shape}$, Step 208.

More particularly, given a set of transformation parameters for the current iteration of the loop, compute image based uncertainties $\Sigma_\Theta$ for the current segmentation. The current uncertainty is then used in conjunction with the current estimate of $\Theta$ to compute the shape component of energy function $E_{shape}$ and obtain the probability of the current shape in the statistical shape model. We want to maximize the probability of a contour belonging to the statistical model $f_H$ which is equivalent to minimizing $E_{shape}(\Theta,\Sigma) = -\log(f_H)$. Using the current shape (when applying the current transformation parameters to the reference shape), the image component of the energy function $E_{image}$ is computed. This image term is based on the resemblance of the inside of the shape in the image (I) to the expected shade of gray of the object and the resemblance of the outside of the shape in the image to the expected shade of gray of the background. The total energy is the sum of the two energy terms $E_{shape}$ and $E_{image}$. The process uses a gradient descent minimization algorithm to determine how to change the transformation parameters towards a smaller value of the energy. The new transformation parameters are estimated according to this minimization step and the process iterates. More particularly, $E_{shape}(\Theta,93\ ) = -\log(f_H)$ and $E_{image}$ are computed, $\Theta$ is changed, a new covariance matrix is computed as $\Sigma^{-1}{}_\Theta$, to thereby compute a new $E_{shape}(\Theta,\Sigma) = -\log(f_H)$ and $E_{image}$ until the total energy function $E_{shape}$ plus $E_{image}$ is minimized.

When reaching the minimum of the cost function in Step 208, the process exits the iterative loop to produce the final segmentation result.

Segmentation of Corpus Callosum

The process described above in connection with FIGS. 1 and 2 is applied below to an example, here the process is used to segment the corpus callosum. The corpus callosum is a thick bundle of nerve fibers that connect the left and right hemispheres in the brain. It is believed to be responsible for balancing the load of leaning tasks across each hemisphere, making each specialized in certain tasks. While not learning, it is responsible for routing most of the communication between the two hemispheres. This is the reason why a surgical procedure has been developed to cut the corpus callosum in patients with severe epilepsy for which drug treatment is ineffective. In addition, several studies indicate that the size and shape of the corpus callosum is related to various types of brain dysfunction such as dyslexia, J. M. Rumsey, M. Casanova, G. B. Mannheim, N. Patronas, N. DeVaughn, S. D. Hamburger, T. Aquino, Corpus callosum morphology, as measured with MRI, in dyslexic men, *Biological Psychiatry*, 39(9):769-777, 1996, or schizophrenia M. Frumin, P. Golland, R. Kikinis, Y. Hirayasu, D. F. Salisbury, J. Hennen, C. C. Dickey, M. Anderson, F. A. Jolesz, W. E. L. Grimson, R. W. McCarley, and M. R. Shenton. Shape differences in the corpus callosum in first-episode schizophrenia and first-episode psychotic affective disorder. *American Journal of Psychiatry*, 159:866-868, 2002. Therefore, neurologists are interested in looking at the corpus callosum and analyzing its shape. Magnetic resonance imaging (MRI) is a safe and non-invasive tool to image the corpus callosum. Since manual delineation can be very time consuming, we demonstrate how our algorithm can be used to segment the corpus callosum on mid-sagittal MR slices.

Thus, referring to FIG. 1, a reference shape model $C_{MODEL}$ is provided, Step 100. A training set $\{C_1, C_2, \ldots, C_N\}$ of N shapes representing the structure of interest is provide. Step 102. The process then performs a shape registration based on a distance transformation (affine plus FFD), Step 104 described in copending patent application Ser. No. 11/366,236 filed Mar. 2, 2006 entitled "Methods for Entity Identification", inventors M. Taron, N. Paragios, M.-P. Jolly, assigned to the same assignee as the present invention, the entire subject mater thereof being incorporated herein by reference. Also incorporated herein by reference is U.S. Provisional Patent Application Ser. No. 60/664,503, filed 23 Mar. 2005 assigned to the same assignee as the present invention.

More particularly, the model building task includes recovering a probabilistic representation of this set. In order to remove all the pose variation from the training set, all shapes have to be registered to a common pose with respect to an affine transformation. Then the reference shape model $C_{MODEL}$ is locally registered to every sample of the training set $C_i$ using implicit polynomials. First the registration process (Step 104) will be described and then the calculation of uncertainties on the registered model will be described, Step 108. The uncertainty measures represent the allowable range of variations in the deformations of the model $C_{MODEL}$ that still match $C_i$. These uncertainties are then used in the estimation of probability density function of the deformations Step 114.

Registration through Implicit Polynomials, Step 104

In the classical, active shape models (ASM), the initial step is used to recover explicit correspondence between the discretized contour of the model shape and the training examples. In the present framework, the model shape is non rigidly registered to every sample from the training, and the statistical shape model is actually built on the parameters of the recovered transformation. Shapes $C_i$ are represented in an implicit fashion using the Euclidean distance transform, see M. Leventon, E. Grimson, and O. Faugeras. Statistical Shape Influence in Geodesic Active Controus, *IEEE Conference on Computer Vision and Pattern Recognition*, pages I:3 16-322, 2000, and N. Paragios, M. Rousson, and V. Ramesh "Matching Distance Functions: A Shape-to-Area Variational Approach for Global-to-Local Registration", *European Conference on Computer Vision*, pages II:775-790, 2002. In the 2D case, we consider the function defined on the image domain $\Omega$:

$$\phi_{C_i}(x) = \begin{cases} 0 & x \in C_i \\ +D(x, C_i) & x \in R_{C_i} \\ -D(x, C_i) & x \in R_{C_i}^- \end{cases}$$

where $R_{C_i}$ is the region enclosed by $C_i$. Such a space is invariant to translation, rotation and can also be modified to account for scale variations. This representation has already been used along with simple criteria like sum of squared differences to address similarity registration (N. Paragios, M. Rousson, and V. Ramesh. Matching Distance Functions: "A Shape-to-Area Variational Approach for Global-to-Local Registration", *European Conference on Computer Vision*, pages II:775-790, 2002), or mutual information for affine transformations, see X. Huang, N. Paragios, and D. Metaxas. "Registration of Structures in Arbitrary Dimensions: Implicit Representations, Mutual Information & Free-Form Deformations", Technical Report DCS-TR-0520, Division of Computer & Information Science, Rutgers University, 2003.

The retained framework for density estimation does not put any constraint on the reference model used for registration. In practice we choose a shape characteristic of the object to segment. Without loss of generality, we can choose for $C_{MODEL}$ a smoothed version of $C_1$. All contours of the training set are now registered to $C_{MODEL}$ with respect to an affine transform and from now on, we will denote $\{C_1, C_2, \ldots, C_N\}$ as the globally registered training set.

Local registration is crucial to model building.

Transformation Parameters, Step 106

To this end one would like to recover an invertible transformation (diffeomorphism) $L_{\Theta i}$ parameterized by a vector $\Theta_i$ that creates a one to one mapping between each contour of the training set $C_i$ and the model $C_{MODEL}$:

$$L_{\Theta i}:R^2 \to R^2 \text{ and } L_{\Theta i}(C_{MODEL}) \approx C_i$$

When $L_\Theta$ is chosen as a 2D polynomial with coefficients $\Theta$ in an appropriate basis, the expression $\phi \circ L_{73}$ inherits the invariance properties of implicit polynomials, i.e. linear transformations applied to $\Theta$ are related to linear transformations applied to the data space. Here, the method uses a simple polynomial warping technique to address the demand of local registration: the free form deformations method (FFD), see D. Rueckert, L. I. Sonoda, C. Hayes, D. Hill, M. Leach, and D. Hawkes. "Nonrigid registration using free-form deformations: Application to breast MR images", *IEEE Transactions on Medical Imaging*, 18:712-721, 1999. The essence of FFD is to deform an object by manipulating a regular control lattice overlaid on its embedding space. The process uses a cubic B-spline FFD to model the local transformation L. Consider the M×N square lattice of points, $[\{P^0_{m,n}\}; (m,n)\in[1;M]\times[1;N]]$. In this case the vector of parameters $\Theta$ defining the transformation L is the displacement coordinates of the control lattice. $\Theta$ has size 2MN:

$$\Theta = \{\delta P_{m,n}\} = \{\delta P^x_{m,n}, \delta P^y_{m,n}\}; (m,n)\in[1;M]\times[1;N]$$

The displacement of a pixel x given the deformation of the control lattice, is defined in terms of a tensor product of Cubic B-splines, see T. Sederberg and S. Parry, "Free-form deformation of solid geometric models", *Proceedings SIGGRAPH '86*, 20:151-160, 1986. As FFD is linear in the parameter $\Theta = \delta P$, it can be expressed in a compact form by introducing X (x) a [2×2MN] matrix:

$$L(\Theta;x) = \Sigma\Sigma B_i(u)B_j(v)(P^0_{i,j} + \delta P_{i,j}) = x + X(x)\Theta$$

where (u, v) are the coordinates of x, and $(B_i, B_j)$ the cubic B-spline basis functions.

Local registration now is equivalent to finding the best lattice configuration such that the overlaid structures coincide. Since structures correspond to distance transforms of globally aligned shapes, the sum of squared differences (SSD) can be considered as the data-driven term to recover the deformation field $L(\Theta;x)$ between the element $C_i$ of the training set and the model $C_{MODEL}$ (corresponding respectively to the distance transform $\phi_i$ and $\phi_M$):

$$E_{data}(\Theta) = \iint_\Omega \chi_{60}(\phi_i(x))[\phi_i(L(\Theta;x)) - \phi_M(x)]^2 dx \quad (1)$$

with $\chi_\alpha(\phi_i(x))$ being an indicator function that defines a band of width $\alpha$ around the contour. In order to further preserve the regularity of the recovered registration, one can consider an additional smoothness term on the deformation field $\delta L$. Here, a computationally efficient smoothness term:

$$E_{smooth}(\Theta) = \iint_\Omega (|L_{xx}(\Theta;x)|^2 + 2|L_{xy}(\Theta;x)|^2 + |L_{yy}(\Theta;x)|^2) dx$$

is considered. The data-driven term and the smoothness constraint component can now be integrated to recover the local deformation component through the calculus of variations. We denote as $\Theta_i$ the reached minimum. However, one can claim that the local deformation field is not sufficient to characterize the registration between two shapes. Data is often corrupted by noise so that the registration retrieved using a deformable model may be imprecise. Therefore, recovering uncertainty measurements, see K. Kanatani, "Uncertainty modeling and model selection for geometric inference", *IEEE Trans. Pattern Anal. Mach. Intell.*, 26(10): 1307-1319, 2004, that do allow the characterization of an allowable range of variation for the registration process is an eminent condition of accurate shape modeling.

Uncertainty Estimation on Registered Shapes, Steps 108, 110

The aim of the process is to recover uncertainties on the vector $\Theta$ in the form of a [2MN×2MN] covariance matrix by adapting a method initially introduced in by C. Stewart, C.-L. Tsai, and B. Roysam, "The dual bootstrap iterative closest point algorithm with application to retinal image registration", *IEEE Trans. Med. Img.*, 22:1379-1394, 2003. The process considers the quality of the local registration on shapes, that is the zero level set of the distance transform. Therefore, $E_{data}$ is formulated in the limit case where $\alpha$, the size of the limited band around the model shape tends to 0. The data term of the energy function can now be expressed as:

$$E_{data}(\Theta) = \int \phi^2_i(L(\Theta;x))dx = \int \phi^2_i(x^2)dx$$

where we denote $x' = L(\Theta_i; x)$. Let us consider q to be the closest point from x' located on $C_i$. As $\phi_i$ is assumed to be a Euclidean distance transform, it also satisfies the condition $\|\nabla\phi_i(x')\| = 1$. Therefore one can express the values of $\phi_i$ at the first order in the neighborhood of x' in the following manner:

$$\phi_i(x' + \delta x') = \phi_i(x') + \delta x' \cdot \nabla\phi_i(x') + o(\delta x') = (x' + \delta x' - q)\nabla\phi_i(x') + o(\delta x')$$

This local expression of $\phi_i$ with a dot product reflects the condition that a point to curve distance was adopted. Under the assumption that $E_{data}$ is small when reaching the optimum, we can write the classical second order approximation of quadratic energy in the form:

$$E_{data}(\Theta) = \int_{C_{MODEL}}[(x'-q)\cdot\nabla\phi_i(x')]^2 = \int_{C_{MODEL}}[(x+X(x)\Theta - q)\nabla\phi_i(x')]^2$$

Localizing the global minimum of an objective function 'E' is equivalent to finding the major mode of a random variable with density $\exp(-E/\beta)'$. The coefficient $\beta$ corresponds to the allowable variation in the energy value around the minimum. In the present case of a quadratic energy (and therefore Gaussian random variable), the covariance and the Hessian of the energy are directly related by $\Sigma^{-1}_{\Theta i} = H_{\Theta i}/\beta$. This leads to the following expression for the covariance:

$$\Sigma^{-1}_{\Theta i} = \frac{1}{\beta}\oint_{C_{MODEL}} X(x)^T \cdot \nabla\varphi_i(x') \cdot \nabla\varphi_i(x')^T X(x)dx$$

In the most general case one can claim that the matrix $H_\eta$ is not invertible because the registration problem is under-constrained. Then, additional constraints have to be introduced towards the estimation of the covariance matrix of $\Theta_i$ through the use of an arbitrarily small positive parameter $\gamma$:

$$E(\Theta) = \int_{C_{MODEL}}[(x+X(x)\Theta - q)\cdot\nabla\phi_i(x')]^2 dx + \gamma\Theta^T\Theta$$

This leads to the covariance matrix for the parameter estimate:

$$\Sigma\Theta_i = [\beta(\int_{C_{MODEL}} X(x)^T \cdot \nabla\phi_i(x') \cdot \nabla\phi_i(x')^T X(x)dx + \gamma I)]^{-1} \quad (2)$$

Where "I" is the identity matrix.

Hybrid Kernel Based Density Function and Kernel Selection, Step 112

Now that all shapes of the training set have been aligned, standard statistical techniques like PCA or ICA could be applied to recover linear Gaussian models. But in the most general case shapes that refer to objects of particular interest vary non-linearly and therefore the assumption of simple parametric models like Gaussian is rather unrealistic. Therefore within our approach we propose a non-parametric form of the probability density function.

Let $\{\Theta_1 \ldots \Theta_N\}$ be the N vectors of parameters associated with the registration of the N sample of the training set. Considering that this set of vectors is a random sample drawn from the density function f describing the shapes, the fixed bandwidth kernel density estimator consists of:

$$\hat{f}(\Theta) = \frac{1}{N} \sum_{i=1}^{N} \frac{1}{\|H\|^{-1/2}} K(H^{-1/2}(\Theta - \Theta_i))$$

where H is a symmetric definite positive (bandwidth matrix) and K denote the centered Gaussian kernel with identity covariance. Fixed bandwidth approaches often produce under-smoothing in areas with sparse observations and over-smoothing in the opposite case.

Kernels of variable bandwidth can be used to encode such a condition and provide a structured way for utilizing the variable uncertainties associated with the sample points. In the literature, kernel density estimation methods that do rely on varying bandwidths are generally referred to as adaptive kernels. Density estimation is performed with kernels whose bandwidth adapts to the sparseness of the data, see M. Wand and M. Jones. *Kernel Smoothing*. Chapman & Hall, 1995.

In the present case, the vectors $\{\Theta_i\}$ come along with associated uncertainties $\{\Sigma_i\}$. Furthermore, the point $\Theta$ where the density function is evaluated corresponds to a deformed model, and therefore is also associated to a measure of uncertainty $\Sigma$. In order to account for the uncertainty estimates both on the sample points themselves as well as on the estimation point, we adopt a hybrid estimator, see A. Mittal and N. Paragios, "Motion-based background substraction using adaptive kernel density estimation", *Computer Vision and Pattern Recognition*, volume 2, pages 302-309, 2004:

$$\hat{f}(\Theta, \Sigma) = \frac{1}{N} \sum_{i=1}^{N} K(\Theta, \Sigma, \Theta_i, \Sigma_i)$$

$$= \frac{1}{N} \sum_{i=1}^{N} \frac{1}{\|H(\Sigma_\Theta, \Sigma_{\Theta_i})\|^{-1/2}} K(H(\Sigma_\Theta, \Sigma_{\Theta_i})^{-1/2}(\Theta - \Theta_i))$$

where we choose for the bandwidth function: $H(\Sigma_\Theta, \Sigma_{\Theta_i}) = \Sigma_\Theta + \Sigma_{\Theta_i}$ as proposed in A. Mittal and N. Paragios. Motion-based background substraction using adaptive kernel density estimation. In *Computer Vision and Pattern Recognition*, volume 2, pages 302-309, 2004. Using this estimator, the density decreases more slowly in directions of large uncertainties when compared to the other directions.

Statistical Shape Model, Step 112

This metric can now be used to assess the probability of a new sample being part of the training set and account for the non-parametric form of the observed density. However, the computation is time consuming because it leads to the calculation of large matrix inverses. Since the cost is linear in the number of samples in the training set, there is an eminent need to decrease its cardinality by selecting the most representative kernels.

The maximum likelihood criterion expresses the quality of approximation from the model to the data. We use a recursive sub-optimal algorithm to select kernels and therefore build a compact model that maximizes the likelihood of the whole training set.

Consider a set $Z_K = \{X_1, X_2, \ldots, X_K\}$ of K kernels extracted from the training set with mean and uncertainties estimates $\{X_i = (\Theta_i, \Sigma_i)\}_{i=1}^{K}$. The log likelihood of the entire training set according to this model is:

$$C_K = \sum_{i=1}^{N} \log\left(\frac{1}{N} \sum_{(\Theta_j, \sigma_j) \in Z_K} K(\Theta_j, \Sigma_j, \Theta_i, \Sigma_i)\right)$$

A new kernel $X_{K+1}$ is extracted from the training set as the one maximizing the quantity $C_{K+1}$ associated with $Z_{K+1} = Z_K \cup X_{K+1}$. The same kernel may be chosen several times in order to preserve an increasing sequence $C_K$. Consequently the selected kernels $X_i$ in $Z_K$ are also associated with a weight factor $\omega_i$. Once such a selection has been completed, the hybrid estimator is evaluated over $Z_K$:

$$\hat{f}_H(\Theta, \Sigma) = \frac{1}{N} \sum_{(\Theta_i, \sigma_i, \omega_i) \in Z_K} \omega_i K(\Theta, \Sigma, \Theta_i, \Sigma_i) \quad (3)$$

Shape Based Segmentation Applied to the Corpus Callosum, Steps 200 Through 212

Let us consider an image I where the corpus callosum structure is present and is to be recovered. Recall that we now have a model of the corpus callosum (Step 200): a shape that can be transformed using an affine transformation and a FFD, and a measure of how well the deformed shape belongs to the family of trained shapes.

Thus, an image, here an MRI, is obtained from the patient, Step 202. Let $\phi_M$ be the distance transform of the reference model. As described above, segmentation consists of globally and locally deforming $\phi_M$ towards delineating the corpus callosum in I (Steps 204 through 206). Let A be an affine transformation of the model and $L(\Theta)$ its local deformation using FFD as previously introduced.

For now, we assume that the visual properties of the corpus callosum $\pi_{cor}()$ as well as the ones of the local surrounding area $\pi_{bck}()$ are known. Then segmentation of the corpus callosum is equivalent to the minimization of the following energy with respect to the parameters $\Theta$ and A:

$$E_{image}(A, \Theta) = -\iint_{R_M} \log[\pi_{cor}(I(A(L(\Theta; x))))] dx$$

$$- \iint_{\Omega - R_M} \log[\pi_{bkg}(I(A(L(\Theta, x))))] dx$$

where $R_M$ denotes the inside of $C_M$. However, the direct calculation of variations involves image gradient and often converges to erroneous solutions due to the discretization of the model domain. In that case, we change the integration domain to the image by implicitly introducing the inverse transformation (see Appendix). A bimodal partition in the image space is now to be recovered. The definition of this domain $R_{cor}$ depends upon the parameters of the transformation [A, $\Theta$] as:

$$R_{cor} = A(L(\Theta, R_M)) \text{ and } y = A(L(\Theta, x)).$$

Figure 4:
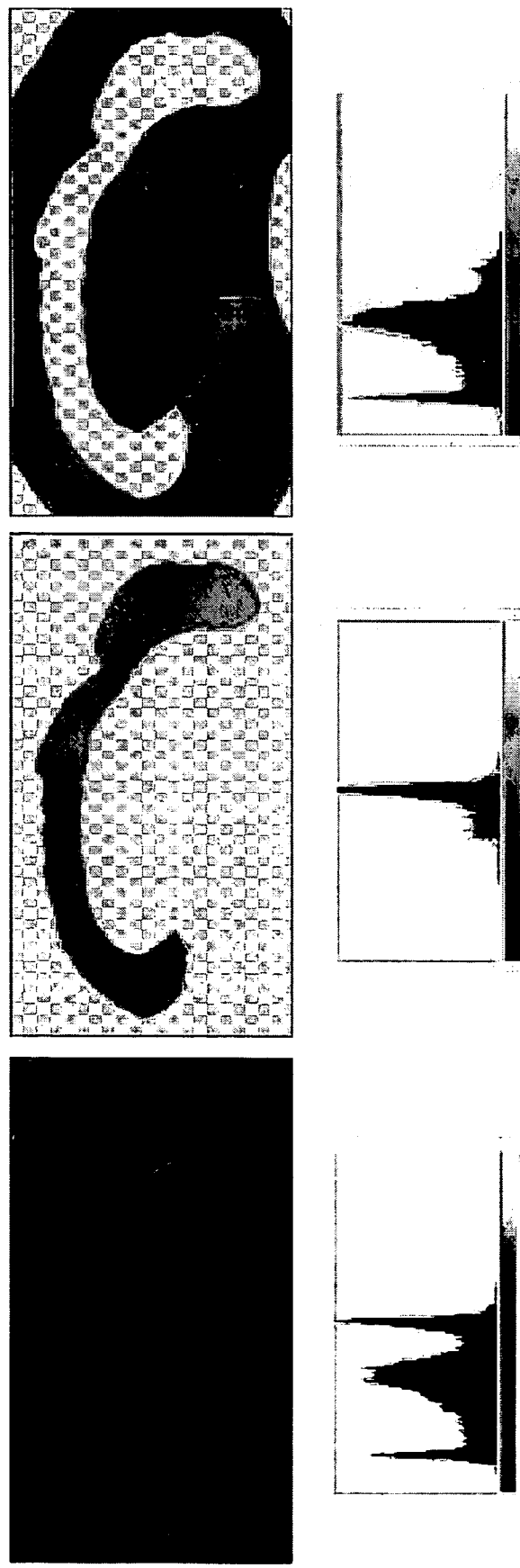
FIG. 4 is a set of histograms of the corpus callosum and the background area useful in understanding the process according to the invention.

The actual image term of the energy to be minimized then becomes:

$$E_{image}(A, \Theta) = -\int\int_{R_M} \log[\pi_{cor}(I(y))]\,dy - \int\int_{\Omega-R_M} \log[\pi_{bkg}(I(y))]\,dy \quad (4)$$

where statistical independence is considered at the pixel as well as hypotheses level. In practice the distributions of the corpus callosum as well as the ones of the surrounding region $[\pi_{cor}, \pi_{bkg}]$ can be recovered in an incremental fashion using the Mumford-Shah principle, see D. Mumford and J. Shah, "Boundary detection by minimizing functionals", *IEEE Conference on Computer Vision and Pattern Recognition*, pages 22-26, 1985. In the present case, each distribution is estimated by fitting a mixture of Gaussians to the image histogram using an Expectation-Maximization algorithm as shown in FIG. 4. The shape based energy term, making use of the non parametric framework introduced earlier is also locally influenced by a covariance matrix of uncertainty calculated on the transformed model. This covariance matrix is computed in a fashion similar to equation (2) with the difference that it may only account for the linear structure of the transformed model and therefore allow variations of $\Theta$ that creates tangential displacements of the contour:

$$\Sigma_\Theta^{-1} = (1/\beta)\left(\oint_{C_M} X(x)^T \cdot \nabla\tilde{\phi}_M(x') \cdot \nabla\tilde{\phi}_M(x')T \cdot X(x)\,dx\right)$$

where $\tilde{\phi}_M$ is the transformation of $\phi_M$ under the deformation $A(L(\Theta))$. Direct computation leads to:

$$\nabla\tilde{\phi}_M(x') = \text{com}[d(L(\Theta,x))/dx] \cdot \nabla\phi_M(x)$$

where 'com' denotes the matrix of cofactors. Then we introduce the shape based energy term $E_{shape}$ using the same notations as in equation (3) as:

$$E_{shape}(\Theta,\Sigma_\Theta) = -\log(f_H(\Theta,\Sigma))$$

The global energy is minimized, Step 208, with respect to the parameters of A and $\Theta$ through the computation of variations on $E = E_{image} + E_{shape}$ and implemented using a standard gradient descent.

Experimental Results

We have applied our method to the segmentation of the corpus callosum in MR midsagittal brain slices.

The first step was to build a model of the corpus callosum. Minimization of the registration energy is performed using gradient descent. In parallel, we successively refine the size of the band $\alpha$ around the contour (from 0.3 to 0.05 times the size of the shape), while we increase the complexity of the diffeomorphism (from an affine transformation to an FFD with a regular [7×12] lattice).

Figure 3:
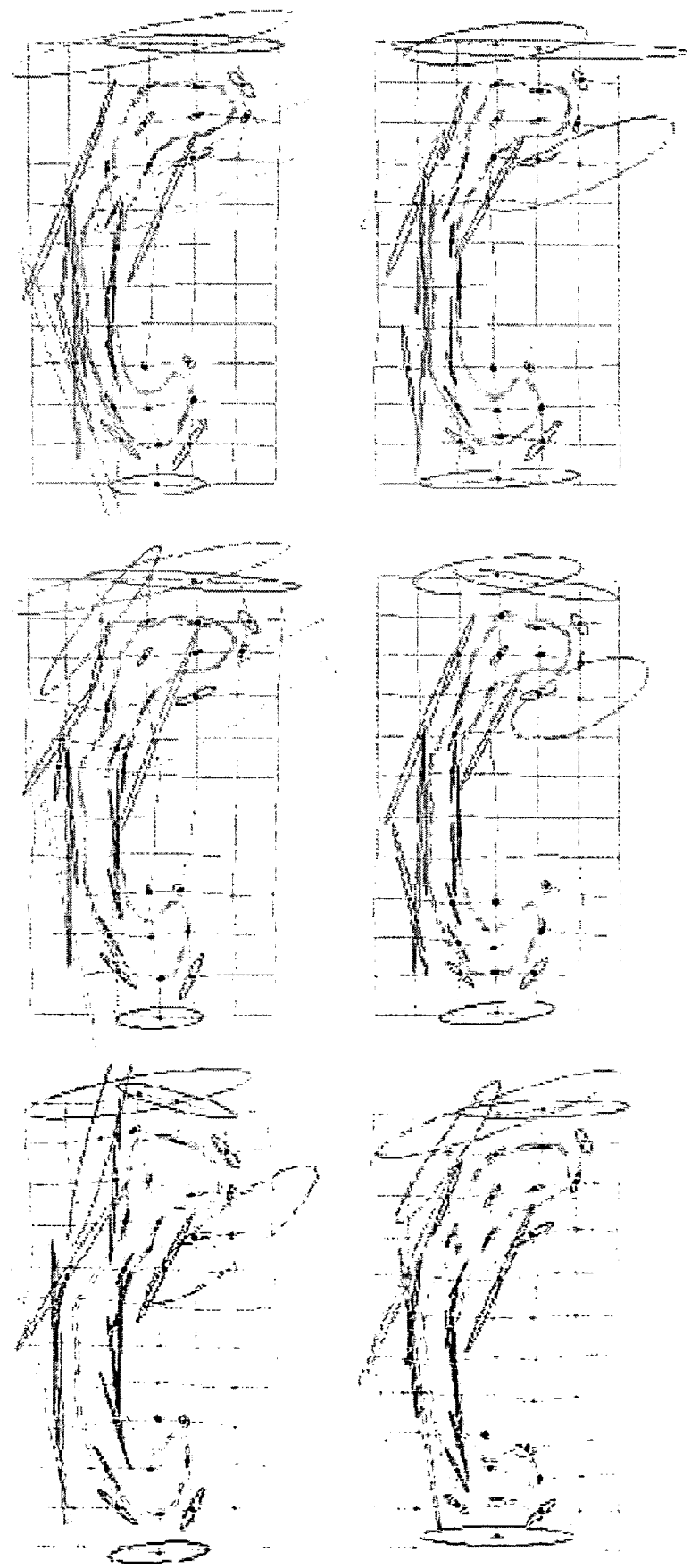
FIG. 3 is a set of diagrams generated by the process of FIG. 1 showing implicit higher order polynomials and registration of corpus callosum with uncertainty estimates.

FIG. 3 shows examples of FFD deformations along with uncertainty ellipses. These ellipses are the representation of the 2D conic obtained when projecting the covariance matrix $\Sigma_\Theta$ (of size 168×168) on the control points. It therefore does not allow us to represent the correlations between control points.

Figures 5A, 5B, 5C:
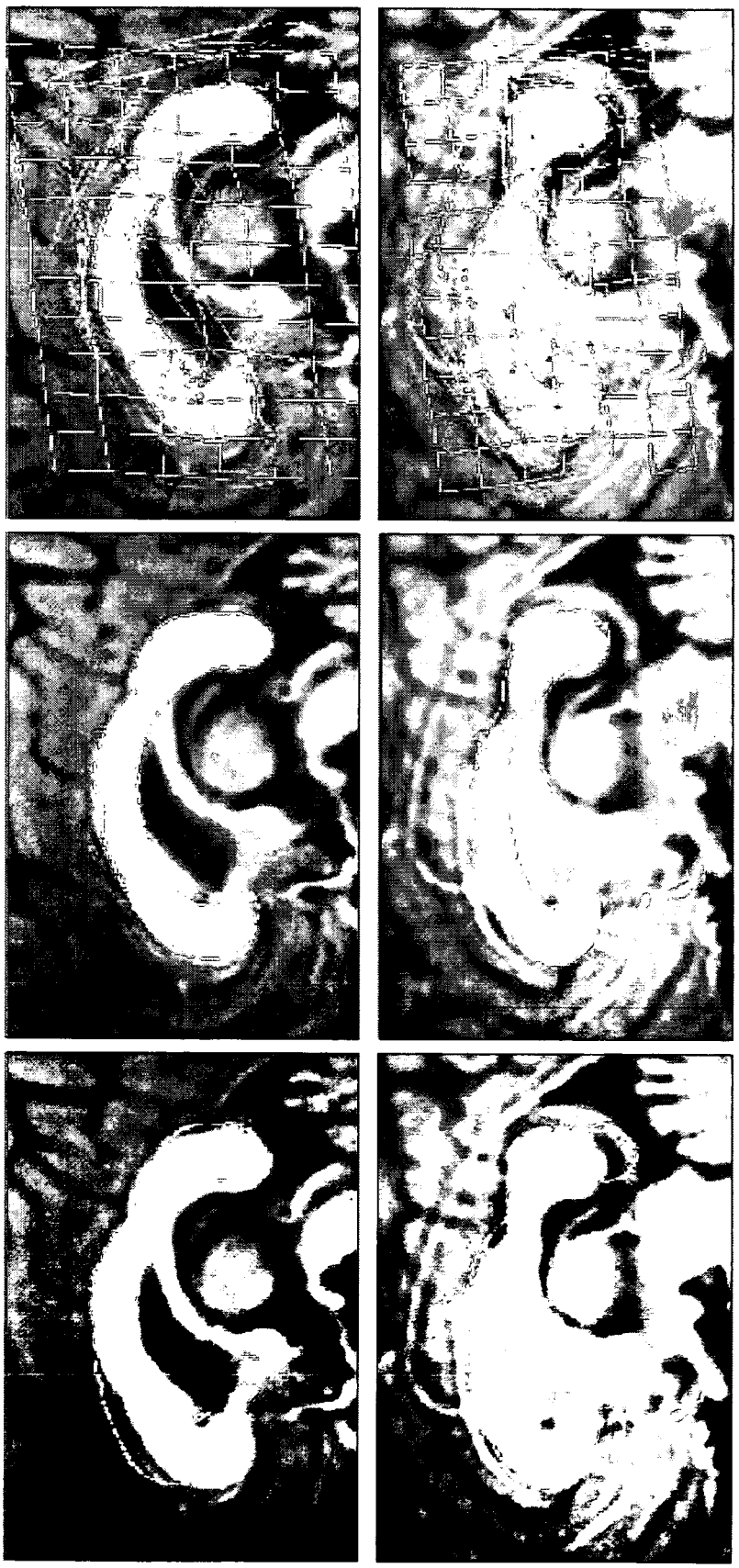
FIGS. 5A-5C show segmentation with uncertainties estimates of the corpus callosum.
Figure 6:
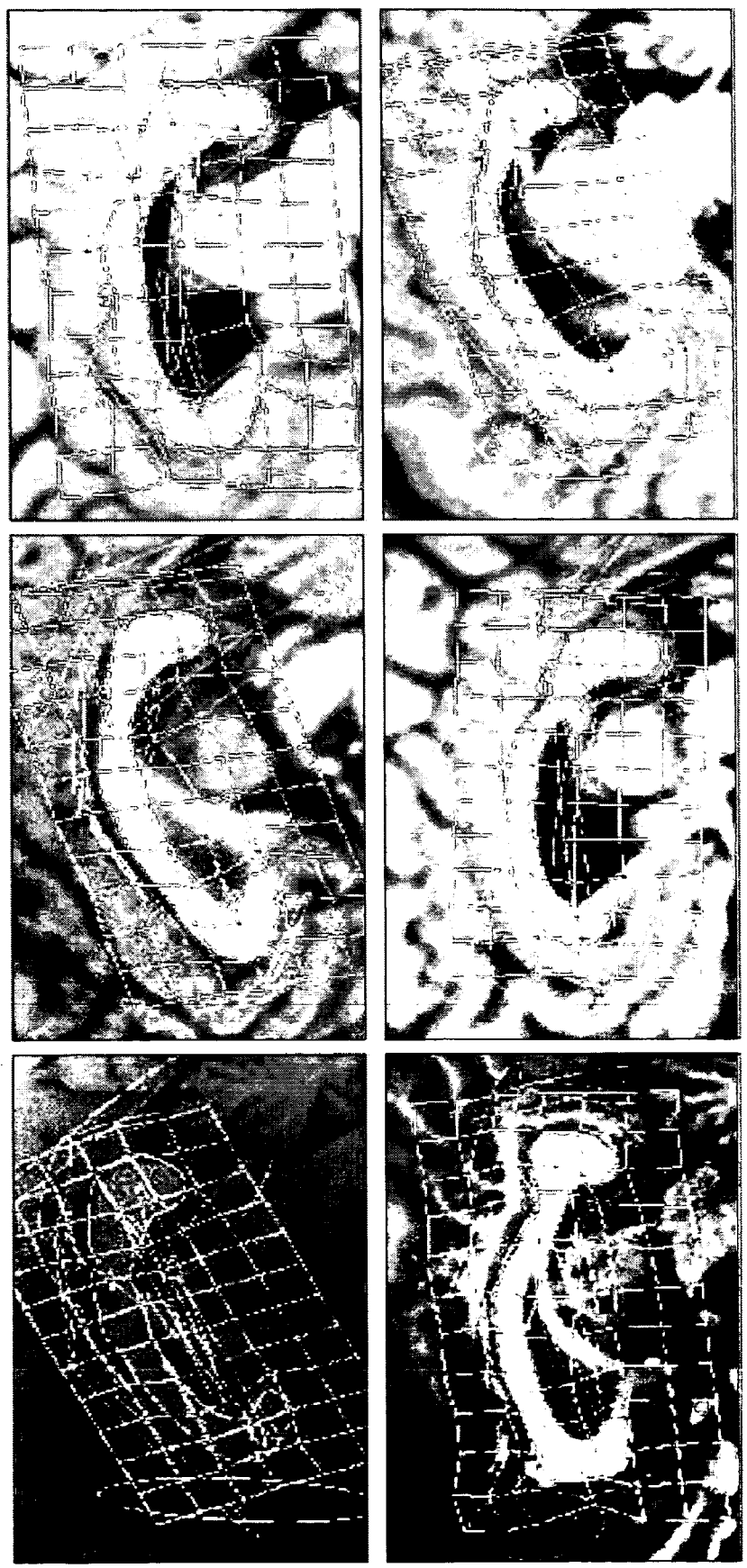
FIG. 6 shows additional segmentation results with uncertainty measures obtained according to the invention.

The segmentation process is initialized by positioning the initial contour according to the method proposed in A. Lundervold, N. Duta, T. Taxt, and A. Jain. Model-guided segmentation of corpus callosum in MR images. In CVPR, pages 1231-1238, 1999. Energy minimization is performed through gradient descent, while the PDF $\pi_{cor}$ and $\pi_{bkg}$ are estimated by mixtures of Gaussians. FIG. 4 shows the histogram of a typical image of the corpus callosum. The figure illustrates how well mixtures of two Gaussian distributions can represent the individual histograms for the corpus callosum and the background, respectively. Segmentation results are presented in (FIG. 5 and FIG. 6) along with the associated uncertainties. In FIG. 5, we demonstrate the individual steps of the segmentation process: the left most image shows the automatic initialization of the contour, the middle image shows the contour after the affine transformation has been recovered, and the right image shows the local deformations. FIG. 6 shows additional results and illustrates that our method can handle a wide variety of shapes for the corpus callosum as well as large variations in image contrast. It can be seen that the results in the bottom left image is not perfect. In general, failures may be due to the fact that the shape constraint is not strong enough and the contrast in the image dominates the deformation. Also, it might be that the shape of this particular corpus callosum cannot be captured with the current Probability Density Function (PDF) because it has been reduced to only 10 kernels.

CONCLUSIONS

A method has been described to account for prior knowledge in the segmentation process using non-parametric variable bandwidth kernels that are able to account for errors in the registration and the segmentation process. The method can generate a very good model of the object of interest and produce very good segmentation results. However the method of kernel selection presented above has shown some limitation in practice. Therefore there is a strong need to build more efficient and compact estimators of the shape variation PDF which account for these uncertainty measures. It is also important to note that this method can be extended to higher dimensions. Building models in 3D and segmenting objects of large variability is the next step of our research work.

Last, but not least, introduction of uncertainties directly measured in the image as part of the segmentation process will provide local measures of confidence and could be considered as a major breakthrough in the area of knowledge-based object extraction.

Appendix

In this section we give some further exploration of the calculus of the derivative on the energy term $E_{image}$. We need first to introduce the Heaviside distribution which we note H and the inverse diffeomorphism of $A \circ L(\Theta)$ which we note $G(\Theta)$. This diffeomorphism therefore verifies:

$$A(L(\Theta,G(\Theta,y))) = y \quad (5)$$

For simpler notation purpose we also pose:

$$D(x,y) = -H(\phi_M(x))\log(\pi_{cor}(I(y))) - (1-H(\phi_M(x)))\log(\pi_{bkg}(I(y)))$$

Then the image term of the energy (eq. 4) can be rewritten as:

$$E_{image}(\Theta) = \int_{\Omega} D(G(\Theta, y), y) dy \qquad 5$$

When differentiating Eq. (5) with respect to $\Theta$ and substituting the expression obtained for dG/d$\Theta$ into the expression of dE$_{image}$($\Theta$)/d$\Theta$, we get the following:

$$\frac{dE_{image}(\Theta)}{d\Theta} = -\int_{\Omega} \frac{\partial D}{\partial x^T}(G(\Theta, y), y)$$
$$\left[\frac{\partial(A \cdot L)}{\partial x^T}(G(\Theta, y), \Theta)\right]^{-1} \frac{\partial(A \cdot L)}{\partial \Theta^T}$$
$$(G(\Theta, y)) dy$$

Now changing the integration variable according to the diffeomorphism x=G($\Theta$, y)

$$\frac{dE_{image}(\Theta)}{d\Theta} = -\int_{\Omega} \frac{\partial D}{\partial x^T}(x, A(L(\Theta, x)y) com$$
$$\left[\frac{\partial(A \cdot L)}{\partial x^T}(x, \Theta)\right]^T \frac{\partial(A \cdot L)}{\partial \Theta^T}$$
$$(x, \Theta) dx$$

where 'com' denotes the matrix of cofactors. When calculating explicitly the partial derivative of D with respect to its first variable, this integral further simplifies into a curve integral along the reference model:

$$\frac{dE_{image}(\Theta)}{d\Theta} = -\int_{C_{Model}} \tilde{D}(A(L(\Theta, x))) \left[com\left(\frac{\partial(A \cdot L)}{\partial \Theta^T}(x, \Theta)\right) \cdot \nabla \phi_M(x)\right]^T$$
$$\frac{\partial(A \circ L)}{\partial \Theta^T}(x, \Theta) dx$$

with $\tilde{D}$ defined as:

$$\tilde{D}(y) = -\log(\pi_{cor}(I(y))) + \log(\pi_{bkg}(I(y)))$$

This expression of the derivative refers only to the contour in the model space. Therefore there is no need to parse the entire image domain at every iteration of the gradient descent used in our implementation. Instead, we only scan the model contour at every iterations. Parsing of the images is only necessary when we reevaluate the parameters of the Gaussian mixtures for $\pi_{cor}$ and $\pi_{bkg}$ (every 20 iteration).

A number of embodiments of the invention have been described. Nevertheless, it will be understood that various modifications may be made without departing from the spirit and scope of the invention. Accordingly, other embodiments are within the scope of the following claims.

What is claimed is:

1. A method for use in segmenting an object of interest from an image of a patient having such object, comprising:
   using medical imaging apparatus to perform the steps of:
   transforming a generated reference shape of the object to match every one of a plurality of training shapes according to an energy function comprising distorting each one of the training shapes to overlay the reference shape with a parameter $\Theta_i$, being a measure of the amount of distortion required at each grid point to effect the overlay for the i$^{th}$ one of the N training shapes;
   obtaining a vector of the parameters $\Theta_i$, for every one of the training shapes through the minimization of a cost function;
   estimating an uncertainty for every one of the obtained vectors of parameters $\Theta_i$, such uncertainty being quantified as a covariance matrix $\Sigma_i$;
   providing for the plurality of training shapes a statistical model represented as $\tilde{f}_H(\Theta, \Sigma)$ which is the sum of the K Gaussian kernels having a mean $\Theta_i$ and covariance $\Sigma_i$.

2. The method recited in claim 1 wherein the cost function is the sum squared difference between a distance map generated for one of the training shapes and the transformed reference model.

3. The method recited in claim 1 including additionally:
   obtaining the image of the desired object from the patient;
   identifying the desired object of interest in the image of the patient by positioning of the reference shape on the image comprising:
   transforming the generated reference shape to match the obtained image according to the energy function comprising distorting the reference shape to overlay the obtained image with a parameter $\Theta$ being a measure of the amount of distortion required to effect the overlay;
   estimating an uncertainty, such uncertainty being quantified as a covariance matrix $\Sigma$;
   computing a shape term of an energy function E$_{shape}$($\Theta$, $\Sigma$)=$-\log(\tilde{f}_H)$ to obtain the probability of the current shape in the statistical shape model; and
   computing an image term of an energy function E$_{image}$ to evaluate the fit of the shape in the image
   minimizing the energy function E$_{shape}$+E$_{image}$.

4. The method recited in claim 3 wherein the minimizing E$_{shape}$($\Theta$,$\Sigma$)=$-\log(\tilde{f}_H)$ comprises:
   computing E$_{shape}$($\Theta$,$\Sigma_\Theta$)=$-\log(\tilde{f}_H)$ and E$_{image}$;
   changing $\Theta$ according to the derivative of E$_{shape}$+E$_{image}$;
   generating a new covariance matrix as $\Sigma_\Theta$, to thereby compute a new E$_{shape(\Theta,\Sigma\Theta)}$=$-\log(\tilde{f}_H)$ and E$_{image}$ until E$_{shape}$($\Theta$,$\Sigma$)+E$_{image}$ is minimized.

5. The method recited in claim 1 wherein the cost function is the distance between such one of the training shapes and the transformed reference model.

6. A method for learning deformations of an object of interest obtained from an image bank of a patient having such object, comprising:
   using medical imaging apparatus to perform the steps of:
   generating an initial reference shape of the object of interest to be segmented;
   obtaining a predetermined number of, N, images of the desired object from over a general population of such objects, where N is greater than 1;
   transforming the generated reference shape to match every one of N training shapes according to an energy function comprising distorting each one of the N training shapes to overlay the reference shape with a parameter $\Theta_i$ being a measure of the amount of distortion required at each grid point to effect the overlay for the i$^{th}$ one of the N training shapes;

obtaining a vector of the parameters $\Theta_i$, for every one of the N training shapes through the minimization of a cost function;

estimating an uncertainty for every one of the obtained N vectors of parameters $\Theta_i$, such uncertainty being quantified as a covariance matrix $\Sigma_i$;

providing a statistical model represented as $f_H(\Theta,\Sigma)$ cumulating information of the N training shapes modeled with kernels having a mean $\Theta_i$, and covariance $\Sigma_i$.

7. The method recited in claim 6 wherein the uncertainty is computed by assuming that the energy function can be approximated at its minimum by a paraboloid, the width of the paraboloid being representative of the degree of uncertainty.

8. The method recited in claim 7 wherein the reference shape is on a reference coordinate system having an overlaid free form deformation grid. Such free form deformation grid having a plurality of grid points with positions represented in the vector $\Theta$, with a the projection of the covariance matrix onto a grid point being represented as an ellipse elongated in the direction of greater uncertainty, and wherein, in the case of smooth linear contours, a component is tangent to the reference shape and another component is normal to the reference shape.

9. The method recited in claim 6 including additionally:
obtaining the image of the desired object from the patient;
identifying the desired object of interest in the image of the patient by positioning of the reference shape on the image comprising:
  transforming the generated reference shape to match the obtained image according to the energy function comprising distorting the reference shape to overlay the obtained image with a parameter $\Theta$ being a measure of the amount of distortion required to effect the overlay;
  estimating an uncertainty, such uncertainty being quantified as a covariance matrix $\Sigma$;
  computing an energy function $E_{shape}$ to obtain the probability of the current shape in the statistical shape model; and
  minimizing $E = E_{shape} + E_{image}$ comprising:
    computing $E_{shape}(\Theta,\Sigma) = -\log(f_H)$;
    computing $E_{image}$;
    changing $\Theta$;
    generating an updated covariant matrix with the changed $\Theta$;
    recomputing the energy function $E = E_{shape} + E_{image}$.

* * * * *